Figure 8:
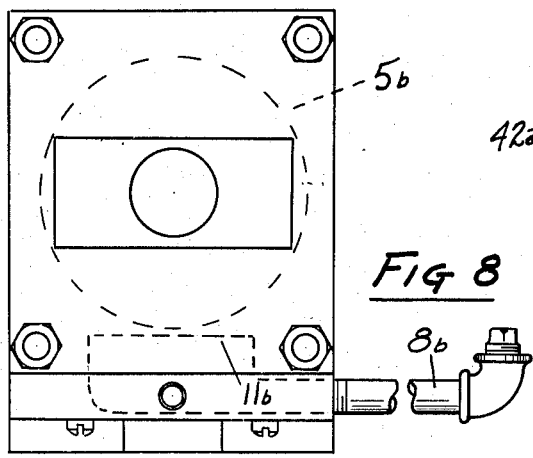

June 10, 1958 — L. WALLERSTEIN, JR — 2,838,137
SELF TUNING VIBRATION ABSORBER
Filed Jan. 17, 1955 — 6 Sheets-Sheet 1
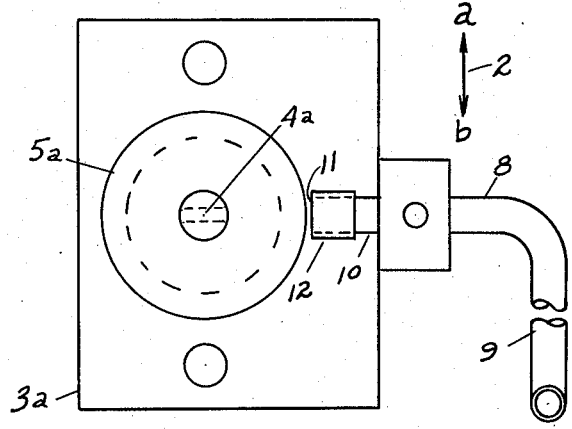
Fig. 1
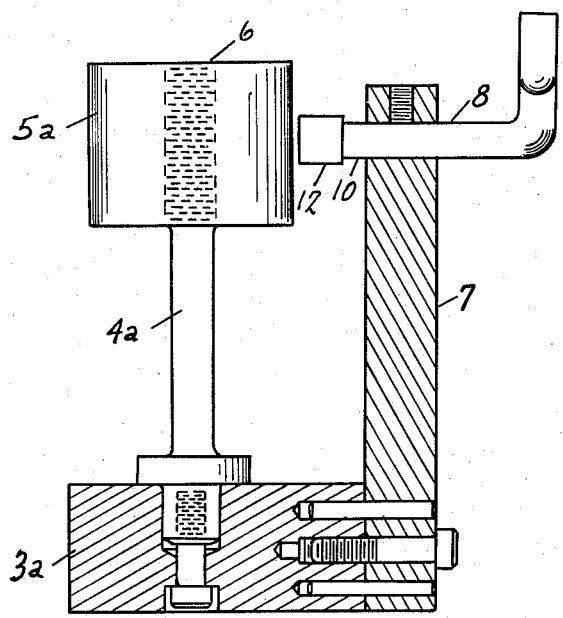
Fig. 2
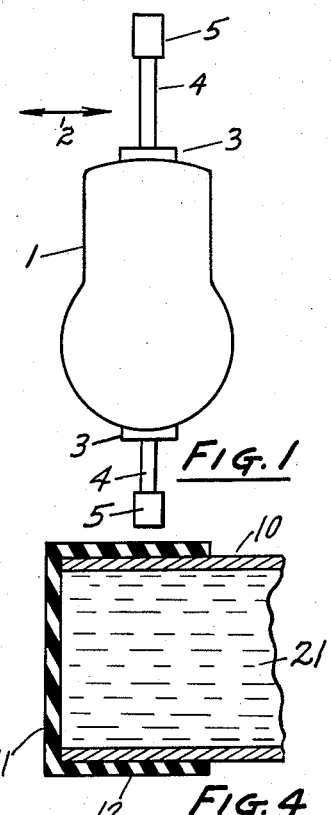
Fig. 3
Fig. 4
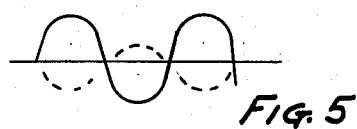
Fig. 5
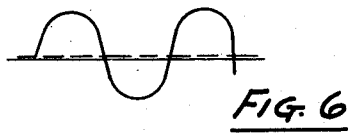
Fig. 6
Fig. 7
INVENTOR.
Leon Wallerstein Jr
BY
Ralph Hamman
Attorney June 10, 1958  L. WALLERSTEIN, JR  2,838,137
SELF TUNING VIBRATION ABSORBER
Filed Jan. 17, 1955  6 Sheets-Sheet 2

INVENTOR.
Leon Wallerstein Jr
BY
Ralph Hammar
Attorney

June 10, 1958                L. WALLERSTEIN, JR                2,838,137
                           SELF TUNING VIBRATION ABSORBER
Filed Jan. 17, 1955                                          6 Sheets-Sheet 3

INVENTOR.
Leon Wallerstein Jr
BY
Ralph Hammar
ATTORNEY

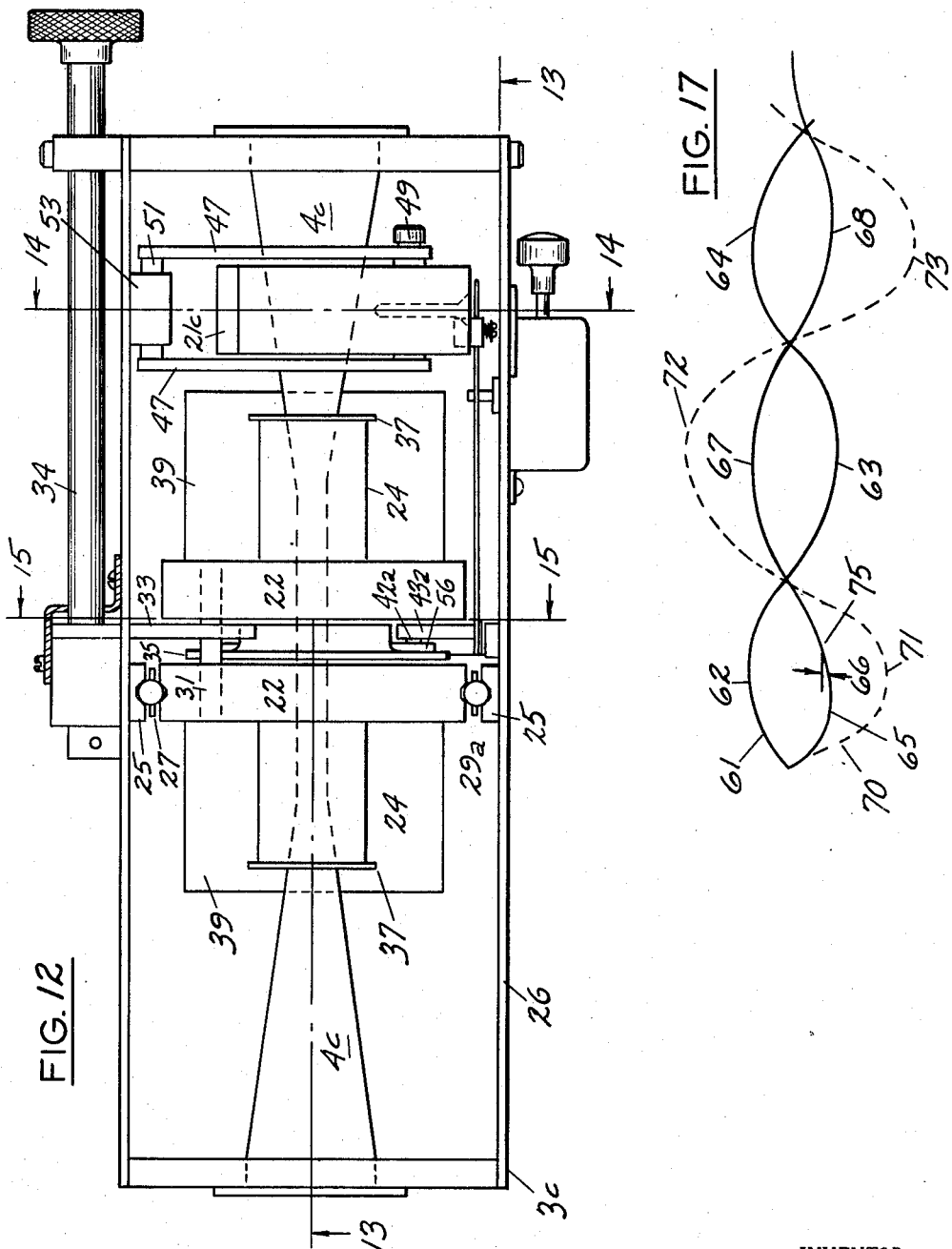

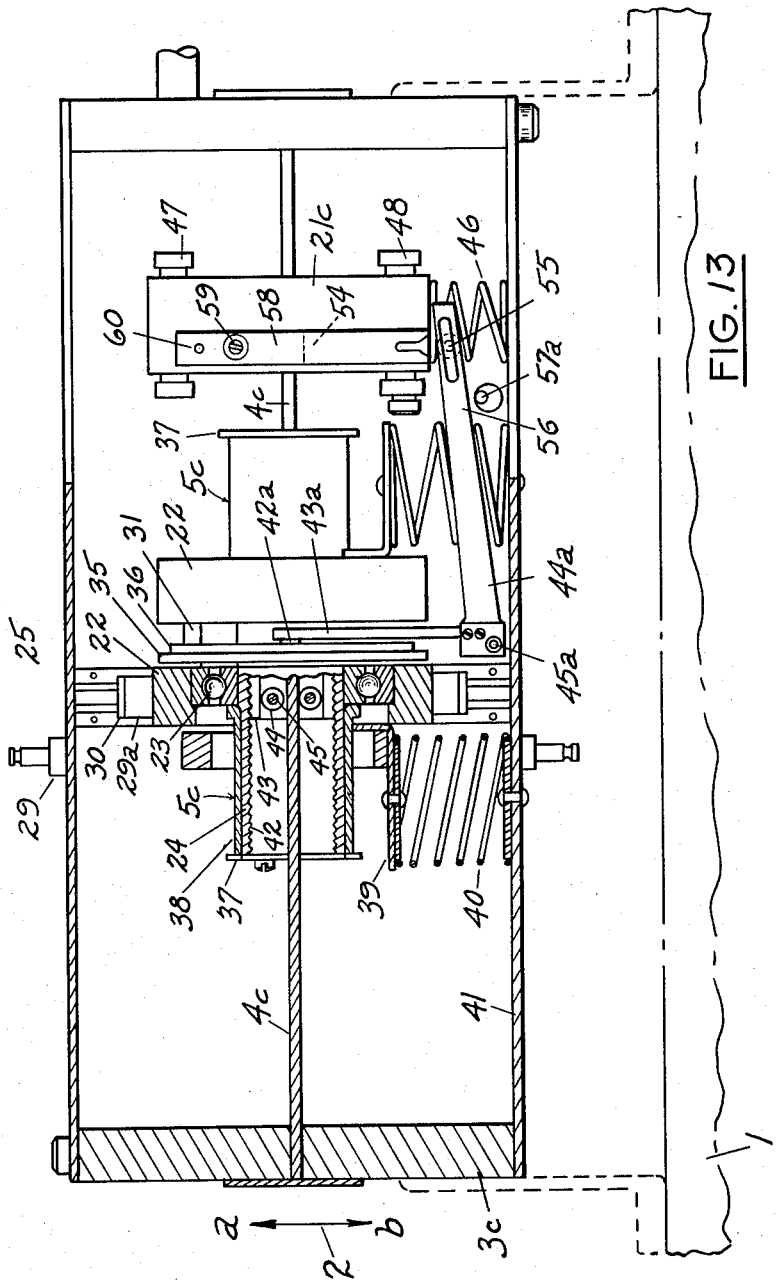

June 10, 1958  L. WALLERSTEIN, JR  2,838,137
SELF TUNING VIBRATION ABSORBER
Filed Jan. 17, 1955  6 Sheets-Sheet 6
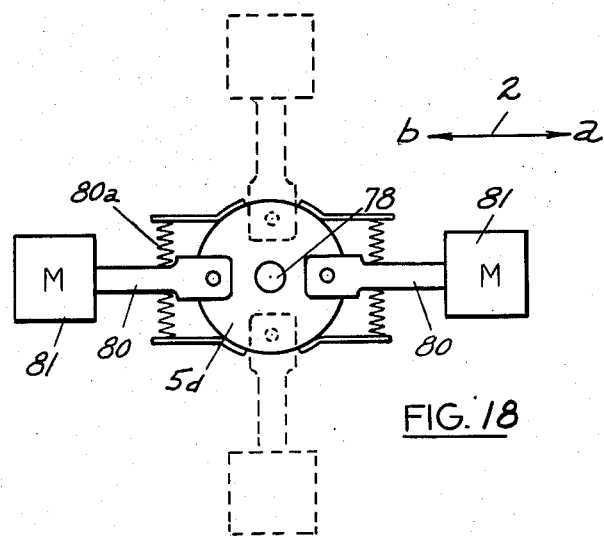
FIG. 18
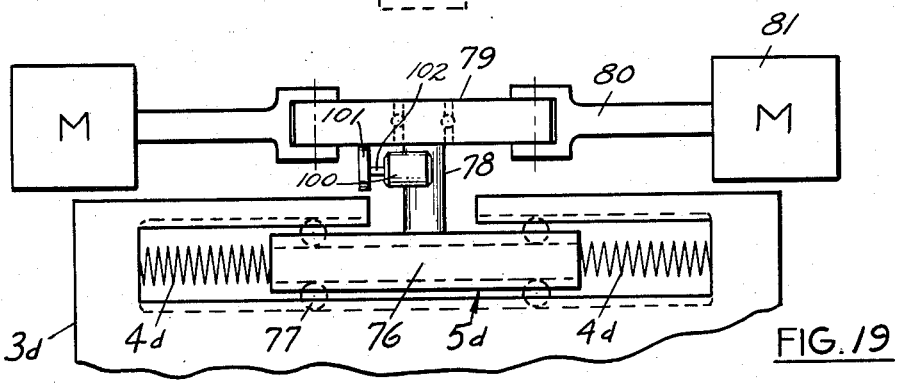
FIG. 19
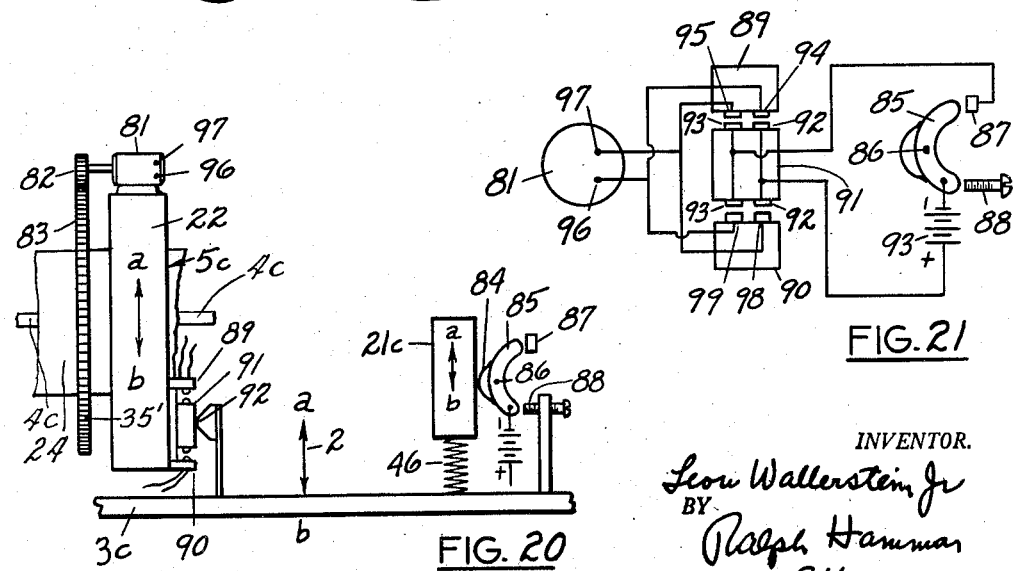
FIG. 21
FIG. 20
INVENTOR.
Leon Wallerstein Jr
BY
Ralph Hammar
Attorney United States Patent Office 2,838,137
Patented June 10, 1958

2,838,137

SELF TUNING VIBRATION ABSORBER

Leon Wallerstein, Jr., Erie, Pa., assignor to Lord Manufacturing Company, Erie, Pa., a corporation of Pennsylvania Application January 17, 1955, Serial No. 482,070

15 Claims. (Cl. 188—1)

It has been known that the vibration of a body can be greatly reduced or eliminated by attaching to it a small spring-mass combination whose natural frequency is equal to that of the disturbing vibration. The small mass may be of the order of magnitude of only a few percent of the larger mass. Such a device is known as an undamped dynamic vibration absorber and is fully described and analyzed in many texts on the subject of vibration. A recognized shortcoming of this device is that it is fully effective only when the disturbing frequency is equal to the natural frequency of the absorber. When the vibration frequency varies, the device is worse than none at all since it creates two resonant periods where one existed before.

A device known as a damped vibration absorber tends to reduce the effect of the two resonant frequencies but only at a sacrifice in the effectiveness of the damper at the intermediate frequency where it would normally eliminate all vibration.

This invention is intended to provide an undamped dynamic absorber which will be self-tuning and will adjust its natural frequency to correspond with a variable disturbing frequency. It, thereby, provides complete vibration absorption throughout its entire tuning range. One use of the absorber is for engines where the vibration or shaking of the engine has caused failure of engine mounted accessories. The vibration absorber does not operate upon the principle of reducing the transmission of vibration from the vibrating engine to its support, but instead prevents or materially decreases the actual vibration or shaking of the engine. Another use for the absorber is for preventing the flutter of aircraft surfaces and fuselage vibration. Still another use is the prevention of vibration of structures or frames such as looms or structural sections of buildings or vehicles. Another use of the absorber is for preventing rotor induced vibration in helicopters.

Figure 16:
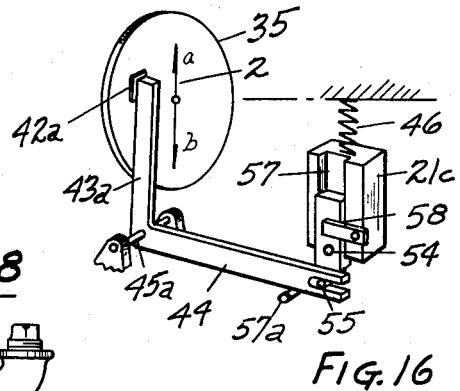
Figure 9:
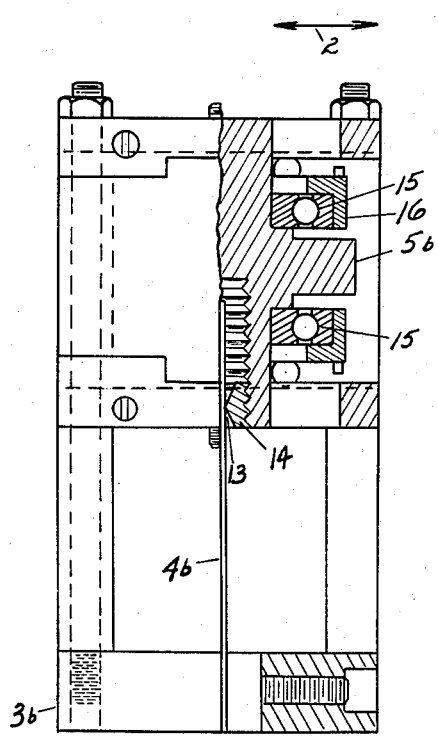
Figure 10:
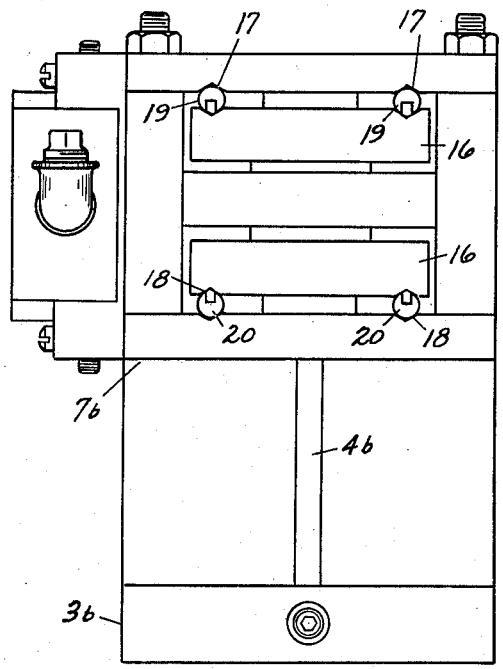
Figure 11:
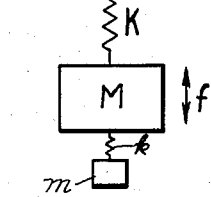
Figure 14:
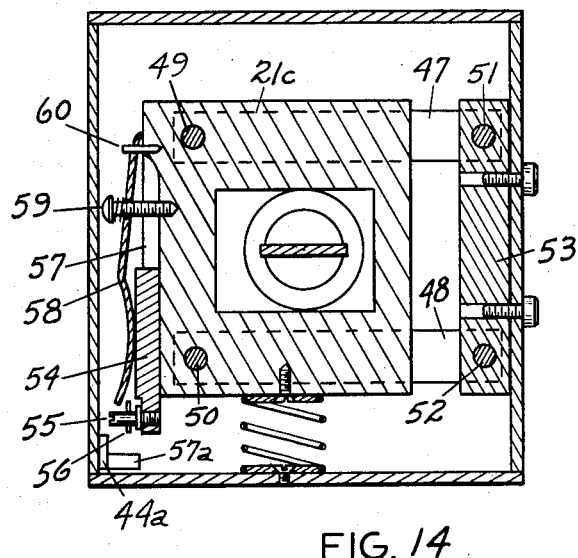
Figure 15:
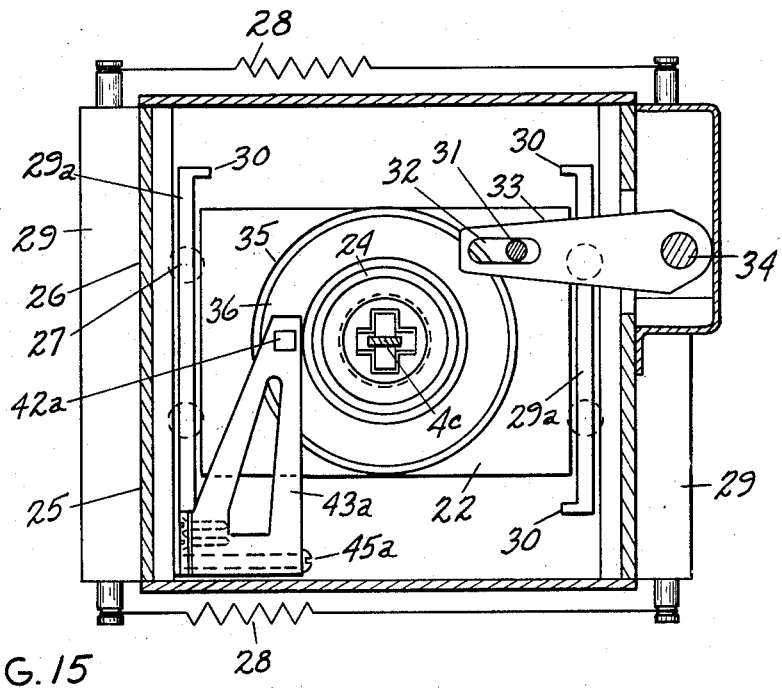

In the accompanying drawings, Fig. 1 is a diagrammatic view of an engine having two vibration absorbers mounted thereon; Fig. 2 is a top plan view of the vibration absorber; Fig. 3 is an elevation of the vibration absorber; Fig. 4 is an enlarged fragmentary view of the arrangement for tuning the vibration absorber; Figs. 5, 6 and 7 are diagrams illustrating the relative motion between the vibration absorber mass and the body to which the absorber is attached when the vibration absorber is tuned respectively below resonance, at resonance and above resonance with the disturbing frequency; Fig. 8 is a top view of a modification of the vibration absorber in which the weight of the absorber mass is kept off the tuning threads; Fig. 9 is a side view of the Fig. 8 vibration absorber; Fig. 10 is an end view; Fig. 11 is a schematic representation of a body with a tuned absorber attached; Fig. 12 is a top view, with the cover removed, of another form of the vibration absorber having a more refined form of tuning mechanism; Fig. 13 is a section of Fig. 12 on line 13—13; Fig. 14 is a section of Fig. 12 on line 14—14; Fig. 15 is a section of Fig. 12 on line 15—15; Fig. 16 is a schematic representation of a portion of the tuning system of the damper shown in Figs. 12, 13, 14 and 15; Fig. 17 is a diagram explaining the action of the damper; Fig. 18 is a diagrammatic view of an arrangement for tuning the damper by varying the effective absorber mass; Fig. 19 is a side view of Fig. 18; Fig. 20 is a diagram of an electrical drive for tuning the damper; and Fig. 21 is a circuit diagram.

Referring to the schematic drawings Fig. 11, M represents the vibrating body and K represents the flexibility of the structure to which it is attached. The double ended arrow represents a vibratory disturbance of frequency $f$ acting on the body M. The undamped dynamic vibration absorber is represented by the spring $k$ and the small mass $m$. The natural frequency of the absorber is the square root of $k/m$ and this value must be equal to the disturbing frequency $f$ for the absorber to be effective.

This invention discloses a means whereby either $k$ or $m$ is automatically changed in response to changes in $f$ so that the natural frequency of the absorber is always equal to the value of $f$.

In Fig. 1 of the drawing there is shown an engine 1 (corresponding to M in Fig. 11) which during operation undergoes vibrations of various characters, generally at engine crankshaft speed or some multiple thereof. Attached to the engine are two undamped dynamic vibration absorbers of a simple type consisting of a base 3, a cantilever spring 4 (corresponding to $k$ in Fig. 11), and a mass 5 (corresponding to $m$ in Fig. 11), fixed to the end of the cantilever spring. The two absorbers have the same natural frequency and will effectively suppress certain engine vibrations ($f$ in Fig. 11), so long as these vibrations are of the same frequency as the natural frequency of the absorbers. One type of vibration which they will suppress is torsional vibration of the engine about an axis parallel to its crankshaft. This is accomplished by vibration of the two dampers in an out-of-phase relation so that they create an oscillatory torque on the engine opposite to that of the disturbing torsional vibration. They will also suppress translational vibration in the direction of arrow 2 by in-phase motion of the two absorbers which creates an oscillatory force in opposition to that of the disturbing vibration. This type of vibration absorption, which causes the engine to remain stationary, should be carefully distinguished from vibration isolation through flexible mountings which is concerned with the reduction in transmission of vibration from a vibrating body to its support. The limitation of the type of absorber described is that changes in engine speed from the natural frequency of the absorber makes the absorber ineffective. This limitation is overcome by the self-tuning absorber illustrated in an elementary design in Figs. 2 to 4, inclusive. In this absorber, the base 3a is suitably formed for attachment to the vibrating body; for example, the engine shown in Fig. 1. Fixed to the base is a cantilever spring 4a having at its upper end an enlarged threaded section 6 on which is threaded the cylindrical vibration absorber mass 5a. The parts so far described are entirely equivalent to those of the simple fixed cantilever and mass type of absorber illustrated in Fig. 1, except that the position of the mass on the cantilever spring may be varied by turning it on its screw. This alters the effective length of the spring and changes the natural frequency of the absorber.

In order to tune the absorber so that its natural frequency becomes equal to the disturbing frequency, a diaphragm 11 is supported in close proximity to the rim or cylindrical surface of the absorber mass 5a. A slight pulsing of the diaphragm outwardly, by means to be described, causes it to contact mass 5a. The mass is in vibratory motion back and forth past the diaphragm since the vibration absorber as a whole is attached to a vibrating body. Pulsing of the diaphragm against mass 5a causes a friction drag, turning the mass so that it is threaded either up or down on the threaded portion 6 of cantilever spring 4a. The direction of turning depends on whether the mass is in motion in direction a or b of arrow 2 at the time of contact with the diaphragm 11.

To support and actuate the diaphragm, there is attached to the base 3a an upright support 7, carrying a tube 8 filled with mercury 21. One end 9 of the tube parallels the direction of the exciting vibration indicated by arrow 2. The other end 10 of the tube extends normal to the direction of the exciting vibration and terminates adjacent the vibration absorbing mass 5a and is closed by the said rubber diaphragm 11 on a cap 12 fixed on the tube. The end 9 of the tube 8 may be slightly inclined to insure complete filling of the end 10 of the tube and end 9 is vented to the atmosphere so that the mercury is free to flow in the tube, except as restrained by diaphragm 11.

The diaphragm 11 and the mercury 21 form a spring mass system whose natural frequency is well outside the range of frequencies of the vibration to be absorbed. Preferably, the natural frequency of the spring mass system 11, 21 is below the tuning range of the vibration absorber, but it could be above the tuning range. In the preferred condition, the mercury column vibrates 180° out of phase with the motion of the body to which the vibration absorber is attached and causes a corresponding pulsing of diaphragm 11. Timing of the diaphragm pulse to accomplish the desired tuning is a result of the phasing between motion of the absorber mass 5a and the column of mercury within tube 8.

In Fig. 2, when the base 3a of the absorber, which is attached to the vibrating body is moving in direction a of arrow 2, the mercury column in arm 9 of the tube 8 will be moving in direction b and will tend to suck diaphragm 11 inwardly into the tube. Conversely, when base 3a is moving in direction b, the mercury column will be moving in direction a and the diaphragm will be pulsed outwardly into contact with mass 5a of the absorber. Therefore, contact occurs only when the vibration absorber base is moving in the direction b.

When the vibration absorber natural frequency is less than the disturbing frequency in the main mass 1, the vibration absorber mass 5a will move 180° out of phase with base 3a, as shown in Fig. 5, and will be going in direction a of arrow 2 at the time of diaphragm contact. Friction drag of the diaphragm will turn the mass 5a in a clockwise direction and thread the mass down on the threaded portion 6, thereby shortening the effective length of spring 4a and increasing the natural frequency of the vibration absorber. When the vibration absorber natural frequency is above the disturbing frequency, the mass 5a and base 3a are vibrating in the same direction, but the vibration absorber mass 5a is necessarily vibrating through a greater amplitude. The greater amplitude of 5a results from the fact that a spring-mass system such as 4a and 5a will always magnify the motion of any body to which it is attached when the natural frequency of the spring-mass system is greater than the vibration frequency of the body. This is illustrated in Fig. 7 where the full lines are of greater amplitude than the dotted lines. Under this condition, the diaphragm 11 bulges or pulses into contact with the vibration absorber mass 5a at a time when both the diaphragm 11 and the mass 5a are moving in direction b. However, because the mass 5a is moving faster than the diaphragm 11, a friction drag is exerted on the mass 5a tending to turn it in a counter-clockwise direction or to thread it upward on the threaded portion 6 and thereby decrease the frequency to which the vibration absorber is tuned. Thus, whenever the vibration absorber natural frequency is above or below the exciting frequency in the main mass, the tuning effect exerted by the diaphragm 11 is in the direction to move the vibration absorber natural frequency toward exact resonance with the exciting vibration. The only stable point is that of exact tuning, when all vibration motion of the main mass, e. g., the engine 1, is eliminated or greatly reduced as shown in Fig. 6 and accordingly there is no pulsing of the diaphragm 11 into contact with the vibration absorbing mass 5a.

In Figs. 8, 9 and 10 is shown a modification in which friction forces opposing tuning of the vibration absorbing mass are minimized. Also, in this modification, the vibration absorber mass moves in a straight line rather than arcuately as in the case of Fig. 2 through 4, so that no minor extraneous vibrations are set up during its operation. In this modification, there is a base 3b for attachment to the vibrating body, e. g., the engine 1, which will be oriented so as to respond to vibrations in the direction of the arrow 2. The base carries a cantilever spring 4b having a knife edge contact 13 with a nut or ferrule 14 internally threaded in the vibration absorber mass 5b. The cylindrical vibration absorber mass 5b is journaled by bearings 15 in a carriage 16 slidably guided in ways 17 and 18 by ball bearings 19 and 20. The ways 17 and 18 are carried in a structure 7b which is rigidly attached to the base 3b. The ways 17 and 18 are oriented in the direction of the vibration to be absorbed indicated by the arrow 2. Also mounted on the structure 7b is a tube 8b filled with mercury and aligned with the vibration to be absorbed. The tube 8b communicates with a flexible diaphragm 11b which functions in the same manner as the diaphragm 11 in the Fig. 2 to 4 construction. By reason of the friction drag exerted by the diaphragm 11 on the vibration absorber mass, the vibration absorber mass will be turned in a clockwise or counter-clockwise direction as explained with relation to Figs. 2 through 4. By reason of the threads between the vibration absorber mass and the nut 14, the nut 14 will be moved downward so as to increase the natural frequency of the vibration absorber, or upward to decrease the natural frequency until the natural frequency becomes equal to the frequency of the exciting vibration. At this point of exact resonance, the vibration of the main mass to which 3b is attached, is eliminated and there is no pulsing of the diaphragm 11b into contact with the vibration absorber mass 5b.

In the vibration absorber of Figs. 12 to 15, inclusive, the absorber has a frame or base 3c for attachment to a vibrating body 1 subject to a disturbing vibration having the direction indicated by the arrow 2. Fixed to each end of the base 3c and extending inwardly therefrom is a cantilever spring 4c, each spring having at its center a vibration absorber mass generally indicated by the reference numeral 5c. Although two springs 4c and two masses 5c are shown, they act as a single spring supported mass. The vibration absorber masses 5c are symmetrically disposed at the center of the frame 3c and are made up of masses 22 journaled by bearings 23 on a tuning barrel 24 which surrounds the adjacent ends of the cantilever springs 4c. The masses 22, as shown in Fig. 15, are rectangular in shape and are guided for vertical movement in ball races 25 on side plates 26. The side plates 26 are urged toward each other so as to maintain pressure on the balls 27 by tension springs 28 at the top and bottom of reinforcing bars 29. The balls 27 are spaced apart and kept from escaping the ball races 25 by ball retainers 29a having inwardly projecting flanges 30 at the top and bottom, which stop the movement of the ball retainers at a point at which the balls 27 are kept between the rectangular masses 22 and the races 25. The masses 22 are held in fixed relation, except rotationally by the barrel in which they are both journaled. A pin 31 prevents relative rotational motion of the masses. The pin 31 connecting the masses is received in a slot 32 in an arm 33 fixed to a lock shaft 34. At the center of the barrel 24 between the spaced masses 22 is fixed a disc 35 faced with friction material 36. At each end of the barrel 24 is an end plate 37 which cooperates with sleeves 38 to hold the journal bearings 23 in place. Brackets 39 attached to the masses 22 rest on springs 40 which are supported by the bottom plate 41 of the casing 3c and support the entire absorber mass carried by the casing 3c with a natural frequency very much below the tuning range of the vibration absorber.

The tuner barrel 24 has internal threads 42 at each end, the threads being right-handed at one end and left-handed at the other, and engaging each of the threaded portions is a correspondingly threaded tuner ferrule 43, each carrying a pair of rollers 44 on pins 45 engaging opposite sides of the cantilever spring 4c. When the barrel 24 is rotated in bearings 23, the ferrules 43 are restrained from turning by contact of the rollers 44 with the cantilever springs 4c and are therefore threaded in or out of the barrel 24, depending upon the direction in which the barrel is rotated. The contact point between the rollers 44 and the cantilever springs 4c is thereby altered, changing the natural frequency of the vibration absorber.

Turning of the barrel 24 to tune the natural frequency of the vibration absorber is accomplished in the following manner: The entire absorber mass, which includes the barrel 24 and all of the parts carried thereby vibrates up and down in the direction of the arrow 2 adjacent Fig. 13 due to vibratory motion of the body (e. g., motor 1) to which the base or frame 3c is attached. If pad 42a is brought by arm 43a of bell crank lever 44a into contact at a radius $r$ with the friction face 36 of the disc 35 when the absorber mass is moving downward in direction $b$ and is withdrawn from contact with the friction face 36 when the mass is moving upward in direction $a$, the friction drag during contact of the pad 42a with the friction face 36 causes clockwise turning of the disc and ferrule as viewed in Fig. 15. For counter-clockwise turning, the pad 42a is brought into contact with the friction surface 36 during upward vibration of the absorber mass and is removed from contact during the downward stroke. Pad 42a is moved into and out of contact with the friction surface 36 by rocking of bell crank lever 44a on a pivot pin 45a. The rocking of the bell crank lever 44a is caused by vibratory motion of a tuning mass 21c supported on the base plate 41 by a spring 46 of such stiffness that the natural frequency of vibration of the tuning mass 21c is well outside of (usually below) the frequency of the vibrations which are to be absorbed. The tuning mass 21c is guided by parallelogram links 47, 48 pivoted at 49 and 50 to the tuning mass and at 51 and 52 to a support 53. When the tuning mass has a natural frequency well below the range of frequencies which the absorber is designed to combat, the tuning mass 21c always moves in direction $b$ of arrow 2 when the main body 1 is moving in direction $a$ of arrow 2.

The motion of the tuning mass 21c is transmitted to the bell crank 44a by a friction slide 54 having a pin and slot connection 55 at its lower end to the arm 56 of the bell crank. The slide 54 is guided in a groove 57 and is held against the bottom of the groove by a spring member 58 having a pressure adjusting screw 59 threaded into the tuning mass 21c. A pin 60 cooperates with the adjusting screw 59 to hold the spring 58 in alignment with the friction slide 54.

When the tuning mass 21c moves in the direction $b$, the friction coupling between the mass 21c and the slide 54 causes clockwise rotation of the bell crank 44a, as viewed in Fig. 13, thereby pulling the pad 42a at the free end of arm 43a away from engagement with the friction face 36 of the tuner disc 35. The amount of disengagement is limited to only a few thousandths of an inch by an eccentric stop pin 57a, which engages the underside of the arm 56 and prevents further rotation of the bell crank 44a. As soon as the arm 56 of the bell crank engages the stop pin 57a, the slide 54 slips relative to the tuning mass 21c, which continues its downward movement in the direction $v$. As the tuning mass 21c moves upward in direction $a$, the bell crank 44a is rotated in a counter-clockwise direction bringing the pad 42a into engagement with the friction face 36 of the tuner disc. Further counter-clockwise rotation of the bell crank is thereby stopped and motion of the tuning mass 21c continues in direction $a$ causing relative motion between it and the friction slide 54 and resulting in the transmission of the friction force exerted on the slide through the bell crank to the pad 42a. This friction force is not sufficient to appreciably alter the natural motion of the tuning mass 21c but is sufficient to maintain the desired frictional contact between the pad 42a and the friction face 36 during the period while the tuning mass 21c is moving in direction $a$ and the main body 1 is accordingly moving in direction $b$. It is during this period of contact between the pad 42a and the friction face 36 that tuning of the vibration absorber mass 5c is accomplished. If the natural frequency of the vibration absorber mass 5c on the cantilever springs 4c is too low, the absorber mass will be moving in direction $a$ and the disc 35 fixed to the tuning barrel 24 will be turned by the friction drag of 42 in a counter-clockwise direction, as viewed in Fig. 15. The ferrules 43 are thereby threaded out the ends of the tuning barrel 24, shortening the effective length of the cantilever springs 4c and raising the natural frequency of the vibration absorber mass 5c. If the natural frequency of the vibration absorber mass 5c is too high, the absorber mass will be moving in direction $b$ and the tuning disc 35 will be turned by the friction drag of the pad 42a in a clockwise direction, as viewed in Fig. 15, thereby threading the ferrules 43 into the barrel and lengthening the effective length of cantilever springs 4c so as to lower the natural frequency of the vibration absorber mass 5c. Accordingly, whenever the natural frequency of the vibration absorber mass 5c is above or below the disturbing frequency of the body 1, the tuning disc 35 is turned in the proper direction to bring the natural frequency of the vibration absorber mass 5c into coincidence with the disturbing frequency of the body 1.

Fig. 17 is a diagram illustrating the operation. In this diagram, curve 61 represents the vibratory motion of the body 1, which moves in direction $b$ from point 62 to point 63, and in direction $a$ from point 63 to point 64. Curve 65 illustrates the motion of the seismic mass 21c, which moves in direction $a$ from point 66 to point 67, and in direction $b$ from point 67 to point 68. Because the tuning mass has its natural frequency well below the frequency of vibration of the main body 1, the tuning mass 21c is 180° out of phase with the main body. Curve 70 illustrates the motion of the vibration absorber mass 5c for the condition in which the natural frequency of the vibration absorber mass is too low or is below the vibrating frequency of the main body. From point 71 to point 72, the vibration absorber mass 5c is moving in direction $a$, and from point 72 to point 73 the vibration absorber mass is moving in direction $b$. As explained above, as soon as the tuning mass 21c moves in direction $a$, point 66, the bell crank 44a is rotated in a counter-clockwise direction from contact with stop pin 57 thru clearance 74 between the stop pin and arm 56, said rotation bringing friction pad 42a into contact with friction face 36 of the tuning disc 35 at point 75 on curve 70, and maintaining said contact to point 72. Accordingly, almost an entire half cycle or movement of the tuning mass 21c is utilized to tune the vibration absorber mass 5c toward coincidence with the frequency of the disturbing vibration in the main body 1.

Fig. 16 diagrammatically illustrates the connection for transmitting the motion of the tuning mass 21c to the tuning disc 35. Both the tuning mass and the disc are vibrating in the direction of arrow 2, but the phase relationship varies depending upon whether the vibration absorber is tuned above or below the frequency of the vibration to be absorbed. Whenever the tuning mass 21c moves in direction a, the pad 42a moves against the disc 35 and exerts a turning torque on the disc having a direction depending upon the movement of the disc. The turning torque is clockwise if the tuning disc is moving in direction b when the tuning mass is moving in direction a, and is counter-clockwise if the tuning disc is moving in direction a when the tuning mass is moving in direction a.

Instead of tuning the absorber by varying the effective spring rate ($k$ in Fig. 11), the absorber can be tuned by varying the effective absorber mass ($m$ in Fig. 11). Figs. 18 and 19 show diagrammatically an arrangement for varying the effective absorber mass without changing the spring rate. As there shown 3d indicates a base to be attached to a vibrating body and 4d indicates springs restraining movement of an absorber mass 5d which includes a carriage 76 and the parts carried thereby. The carriage has ball bearing guides 77 in the base which guide it for movement in the direction of arrow 2 which is the direction of the vibration to be absorbed. Fixed on the carriage is a post 78 having a hub 79 journaled thereon. At diametrically opposite points on the hub are pivoted links 80 each carrying at its outer end a mass 81 and centered on the hub by light centering springs 80a which are soft enough so that the natural swinging frequency of each link 80 and mass 81 about its pivot is very low relative to the disturbing frequency range. Thus the pivoted links will stay diametrically opposite each other as the hub 79 turns. When the links 80 are in the full line position in line with the direction of vibration indicated by the arrow 2, the effective absorber mass 5d consists of the carriage 76, the post 78, the hub 79, the links 80 and the masses 81. When the hub 79 is turned 90° so the links 80 are in the dotted line position at right angles to the direction of vibration, the masses 81 remain stationary in space and the absorber mass 5d then consists of the carriage 76, the post 78 and the hub 79. At intermediate positions of the hub 79, the links 80 and the masses 81 are partially effective. Accordingly, by turning the hub 79, the absorber can be tuned with the frequency of the vibration to be absorbed. The arrangement for turning the hub 79 can, for example, be the arrangement of Figs. 20 and 21 which utilize an electric motor. An electric motor 100 for turning the hub 79 can be mounted on the post 78 and can turn the hub by means of a friction wheel 101 on the motor shaft 102.

In Figs. 20 and 21, the absorber mass, for example 5c, includes reversible electric motor 81 suitably connected by a gear 82 to teeth 83 cut in the tuning member 35' to be suitably fixed to the barrel 24 of the Figs. 12–17 damper in place of the disc 35. The tuning of the absorber mass is effected by controlling the direction and amount of rotation of the motor. It will be noted that the motor 81 is part of the vibrating mass.

In the diagrammatic view Fig. 20, which shows only part of the damper of Figs. 12–17, the seismic or tuning mass 21c has a spring friction connection 84 to a switch member 85 pivoted at 86. When the seismic mass moves in direction a, the switch 85 closes on contact 87 and when the seismic mass moves in direction b the switch 85 moves away from contact 87 against stop 88. The contact 87 is accordingly closed only when the seismic mass moves in direction a.

One of the masses 22 which forms part of the absorber mass 5c carries spaced upper and lower blocks 89 and 90 between which is a sliding block 91 having a spring friction connection 92 to the base 3c. When the mass 22 is moving in direction a relative to the base 3c, the block 91 is moved downward against the lower block 90. When the mass 22 is moving in direction b relative to the base 3c the block 91 is moved upward against the upper block 89.

As shown in Fig. 21, the blocks 89, 90 and 91 constitute a double pole reversing switch. The block 91 has upper and lower contacts 92 connected through a battery 93 to the switch 85. The block 91 also has upper and lower contacts 93 connected to the contact 87. The upper block 89 has contacts 94 and 95 respectively opposite contacts 92 and 93, the contact 94 being connected to terminal 96 of the motor 81 and the contact 95 being connected to terminal 97 of the motor. The lower block 90 has contacts 98 and 99 respectively opposite contacts 92 and 93, the contact 98 being connected to the motor terminal 97 and the contact 99 being connected to the motor terminal 96. The block 91 in moving to the upper and lower positions reverses the connection of the battery to the motor and controls the direction of rotation of the motor.

In the operation, the seismic or tuning mass 21c is always 180° out of place with the main body 1 to which the frame 3c is attached because its natural frequency is well below the frequency of vibration of the main body. The phase of the absorber mass 5c of which 22 is a part will be 180° out of phase with the main body when the natural frequency of the absorber mass is below the frequency of vibration of the main body and will be in phase with the main body when the natural frequency of the absorber mass is above the frequency of vibration of the main body. When the natural frequency of the absorber mass is too low, both the seismic mass 21c and the absorber mass 5c will be moving in direction a when the frame 3c is moving in direction b. Movement of 21c in direction a closes switch 85 on contact 87. Movement of 5c in direction a while 3c is moving in direction b pulls block 91 down and closes contacts 92 and 93 on contacts 98 and 99 energizing the motor 81 in the direction to turn the disc 35 to raise the natural frequency of the absorber mass. When the natural frequency of the absorber mass is higher than the frequency of vibration of the frame 3c, and absorber mass 5c moves in the same direction but the absorber mass 5c has a larger amplitude so that when it moves in direction a it pulls block 91 upward closing contacts 92 and 93 on contacts 94 and 95 and energizing the motor in the reverse direction so as to lower the natural frequency of the absorber mass. Accordingly, the absorber mass is always tuned toward resonance with the frequency of vibration of the main body and is kept tuned for maximum absorption of vibration.

What is claimed as new is:

1. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, a tuning mass, means supporting the tuning mass on the support at a natural frequency outside the frequency range of the vibrations to be absorbed, a tuning member, means supporting the tuning member for movement normal to the direction of vibration to be absorbed into and out of contact with the rotatable part while restraining movement in the direction of vibration, and means for transmitting to the tuning member a motion normal to the direction of the vibration to be absorbed into and out of contact with the rotatable part corresponding to the motion of the tuning mass in the direction of the vibration to be absorbed.

2. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, a tuning mass, means supporting the tuning mass on the support for vibration at a natural frequency outside the frequency range of the vibrations to be absorbed, a tuning member, means supporting the tuning member for movement normal to the direction of vibration to be absorbed into and out of contact with the rotatable part while restraining movement in the direction of vibration, and means for transmitting to the tuning member the motion of the tuning mass in the direction of the vibration to be absorbed.

3. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass throughout the range of frequencies of the vibration to be absorbed, a tuning mass, means supporting the tuning mass on the support for vibration at a natural frequency outside the frequency range of the vibrations to be absorbed whereby the tuning mass has a fixed phase relation to the vibrations to be absorbed, and means utilizing the phase relationship between the tuning and vibration absorber masses for adjusting said adjustable means.

4. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, a tuning mass, means supporting the tuning mass on the support for vibration at a natural frequency outside the frequency range of the vibrations to be absorbed, a tuning member, means supporting the tuning member for limited movement normal to the direction of vibration to be absorbed into and out of contact with the rotatable part while restraining movement in the direction of vibration, and a slip friction connection between the tuning mass and the tuning member moving the tuning member into contact with the rotatable part in one direction of movement of the tuning mass and moving the tuning member out of contact with the rotatable part in the opposite direction of movement of the tuning mass.

5. A self-tuned vibration absorber comprising a support for attachment to a vibrating body, a vibrating reed carried by the support, a vibration absorber mass, a threaded connection between the reed and the vibration absorber mass for tuning the natural frequency of the reed and mass, a rotatable part for turning the threaded connection, a liquid filled tube mounted on the support extending in the direction of the vibration to be absorbed, a flexible diaphragm resiliently restraining the liquid in the tube for vibration at a frequency outside the range of the frequencies of the vibrations to be absorbed, said diaphragm being pulsed at each reversal of the support by the movement of the liquid in the tube, and said diaphragm being tangent to the rotatable part and spaced so as to be pulsed into and out of contact therewith.

6. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, a tuning mass, means supporting the tuning mass on the support for vibration at a natural frequency outside the frequency range of the vibrations to be absorbed, a lever pivoted for limited movement into and out of contact with the rotatable part, and a slip friction connection between the tuning mass and the lever moving the lever into contact with the rotatable part in one direction of movement of the tuning mass and moving the lever out of contact with the rotatable part in the opposite direction of movement of the tuning mass.

7. A self-tuned vibration absorber tunable to absorb vibrations of varying frequencies comprising a support, a vibration absorber mass, guideways for the vibration absorber mass extending in the direction of the vibrations to be absorbed, a spring on the support restraining movement of the vibration absorber mass, adjustable means for tuning the natural frequency of the spring and mass including a rotatable part journaled in the vibration absorber mass, a tuning mass, means supporting the tuning mass on the support for vibration at a natural frequency outside the frequency range of the vibrations to be absorbed, a tuning member, means supporting the tuning member for movement into and out of engagement with the rotatable part, and means for transmitting to the tuning member the motion of the tuning mass to move the tuning member into engagement with said rotatable part in one direction of movement of the tuning mass and out of engagement with said rotatable part in the opposite direction of movement of the tuning mass.

8. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, said vibration absorber mass including a weight pivoted on said rotatable part and movable by said part between a position in which the axis of the weight and its pivot are in line with the direction of vibration and a position in which the axis of the weight and its pivot are crosswise to the direction of vibration, a tuning mass, means supporting the tuning mass on the support for vibration at a natural frequency outside the frequency range of the vibrations to be absorbed whereby the tuning mass has a fixed phase relation to the vibrations to be absorbed, and means utilizing the phase relationship between the tuning and vibration absorber masses for turning said rotatable part.

9. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass throughout the range of frequencies of the vibrations to be absorbed, and means responsive to the phase relationship between the vibration absorber mass and the vibration to be absorbed for adjusting said adjustable means to tune the vibration absorber mass into resonance with the vibration to be absorbed.

10. The structure of claim 3 in which the adjusting means includes a motor carried by and forming part of the vibration absorber mass.

11. A self-tuned vibration absorber tunable to absorb vibrations of varying frequencies comprising a support, a vibration absorber mass, a spring on the support carrying the vibration absorber mass, adjustable means for tuning the natural frequency of the spring and mass, a switch moved to the closed position during alternate half cycles of the vibration to be absorbed and to the open position during intermediate half cycles of the vibration to be absorbed, a reversing switch, means responsive to the phase relationship between the absorber mass and the vibration to be absorbed for moving the reversing switch to one or the other of its positions during said alternate half cycles of the vibration to be absorbed depending upon whether the absorber mass is in phase or out of phase with said vibration, and reversible electric motor energized through said switches for driving the adjustable means.

12. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass throughout the range of frequencies of the vibrations to be absorbed, means effective during alternate half-cycles of the vibration to be absorbed for conditioning the adjusting means for actuation, and means responsive to the phase relationship of the absorber mass and the vibrations to be absorbed for activating the adjusting means in one direction when the absorber mass is in phase with the vibration and in the opposite direction when the absorber mass is out of phase with the vibration.

13. A self-tuned vibration absorber tunable to absorb vibrations of varying frequencies comprising a support, a vibration absorber mass, a spring on the support restraining movement of the vibration absorber mass, adjustable means for tuning the natural frequency of the spring and mass including a rotatable part associated and moving with the vibration absorber mass, a tuning mass, means supporting the tuning mass on the support for vibration at a natural frequency outside the frequency range of the vibration to be absorbed whereby the tuning mass has a fixed phase relationship to the vibrations to be absorbed, a tuning member, means supporting the tuning member for limited movement into and out of contact with the rotatable part, and a slip friction connection between the tuning mass and the tuning member moving the tuning member into contact with the rotatable part in one direction of movement of the tuning mass and moving the tuning member out of contact with the rotatable part in the opposite direction of movement of the tuning mass.

14. A self-tuned vibration absorber tunable to absorb vibrations of varying frequencies comprising a support, a vibration absorber mass, a spring on the support restraining movement of the vibration absorber mass, screw threaded adjusting means for tuning the natural frequency of the spring and mass throughout the range of frequencies of the vibration to be absorbed, rotatable drive means for the adjusting means positioned so as not to interfere with the vibration of the vibration absorber mass whereby the tuning of the vibration absorber mass may be accomplished while the absorber is in use to absorb vibrations, and an external control for the rotation of the drive means.

15. A self tuning vibrating device comprising a support subject to disturbing vibrations in a range of frequencies, a mass, a spring on the support restraining movement of the mass, adjustable means for tuning the natural frequency of the spring and mass throughout said range of frequencies, said mass being forced to vibrate at the frequency of the disturbing vibrations and having a phase relationship with respect to the disturbing vibrations respectively in phase with the disturbing vibrations when the mass is tuned above the frequency of the disturbing vibrations and out of phase with the disturbing vibrations when the mass is tuned below the frequency of the disturbing vibrations, a tuning mass, means supporting the tuning mass on the support for vibration at a natural frequency outside said range of frequencies, said tuning mass being forced to vibrate at the frequency of disturbing vibrations and having a fixed phase relationship with respect to the disturbing vibrations, and means utilizing the phase relationship between the first mass and the tuning mass for adjusting said adjustable means to tune the first mass into resonance with the disturbing vibrations.

References Cited in the file of this patent

UNITED STATES PATENTS

| | | |
|---|---|---|
| 989,958 | Fram | Apr. 18, 1911 |
| 2,226,571 | McGoldrick | Dec. 31, 1940 |
| 2,494,358 | Rostoker | Jan. 10, 1950 |

OTHER REFERENCES

Mechanical Vibrations (Den Hartog), published by McGraw-Hill (New York), 1947, page 112. Copy in Scientific Library.